United States Patent Office 2,932,658
Patented Apr. 12, 1960

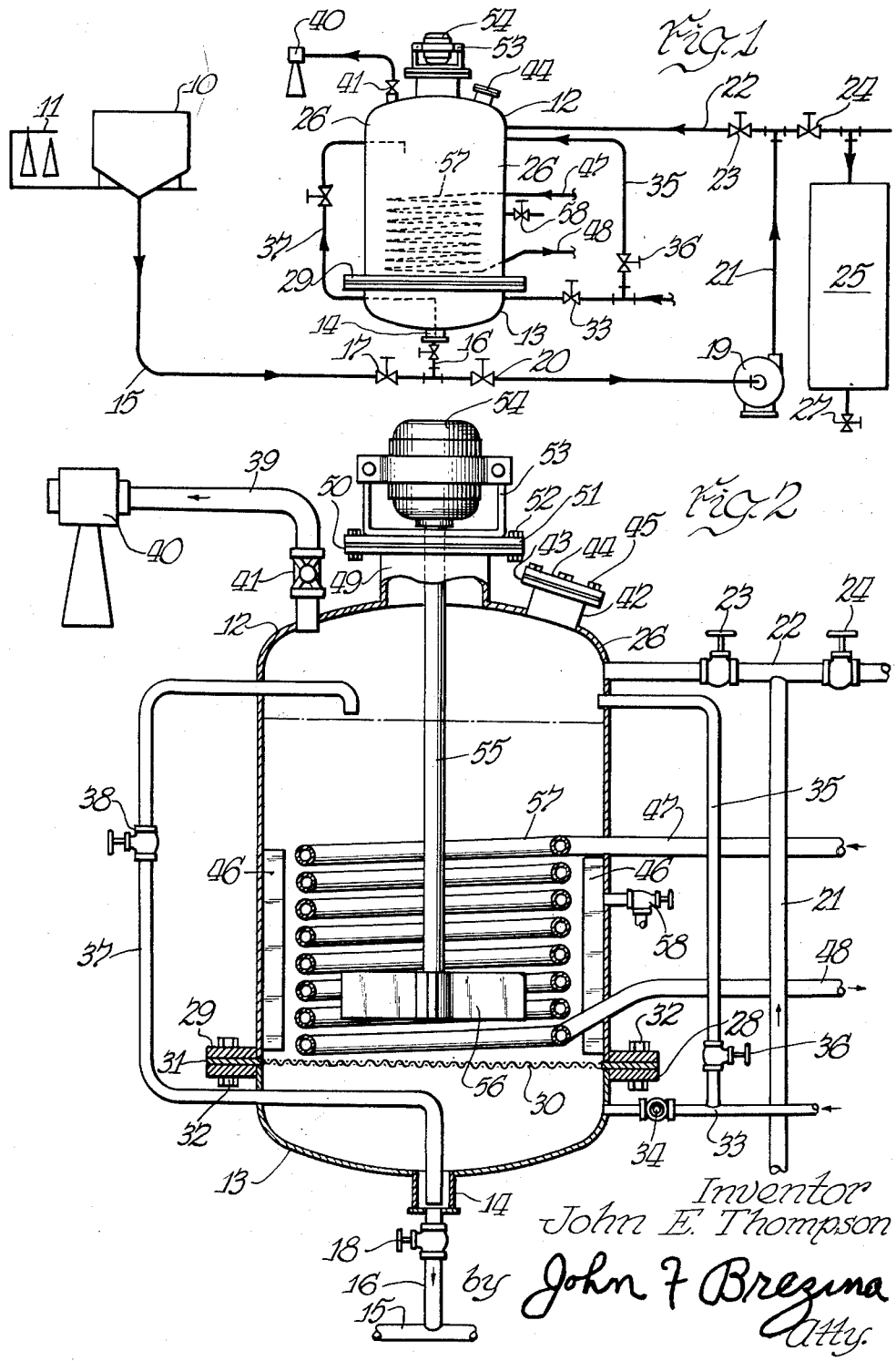

2,932,658
PROCESS AND APPARATUS FOR TREATING OILS WITH HYDROGEN

John E. Thompson, Chicago, Ill.

Application February 25, 1953, Serial No. 338,665

13 Claims. (Cl. 260—409)

This invention relates to catalytic reactions and more particularly it relates to processes and apparatus for causing chemical reactions of liquids with gases in the presence of solid catalysts, i.e., processes and apparatus for effecting heterogeneous catalytic reactions.

At the outset I wish it to be understood that although the example employed in the descriptive portions of this specification relates to the hydrogenation of fat, such example is illustrative only, and that I do not intend that this specification be limited or interpreted as being a description merely of processes or apparatus for the hydrogenation of fats.

Prior to this invention, the techniques and procedures for reacting liquids with gases in the presence of a solid catalyst and reclaiming the catalyst were carried on, in part, in the presence of air. In such prior processes, therefore, it is difficult, if not impossible, to preclude the entry of air and other harmful contaminants into the liquid material.

The problem thus incident to such prior processes is of substantial importance in the hydrogenation of fat, which, in the prior methods required handling of oil in open vessels, because of the desirability of keeping dissolved air and contaminants out of the oil.

Furthermore, in order to reclaim the catalyst in the prior procedures of fat hydrogenation and other heterogeneous catalytic reactions, it is necessary to expose the filter cake to the air and to handling with resultant reduction in the reusability of the catalyst and the requirement for the costly procedure of remeasuring the utility of the remaining catalyst.

It is an object of this invention to provide a new and improved process and device for effecting heterogeneous catalytic reactions.

It is further an object of this invention to provide a process for effecting heterogeneous catalysis in a substantially air-free system.

It is a further object of this invention to provide an apparatus or device and process for chemically reacting a liquid and a gas in the presence of a solid catalyst, wherein the catalyst can be repeatedly reused without handling, and to provide a process and apparatus for effecting a heterogeneous catalytic reaction in which the catalyst may be repeatedly reused without diminution in the utility or amount thereof.

Other and further objects of this invention will become apparent from the following description and the claims appended thereto, reference being had to the accompanying drawings and numerals of reference thereon.

On the drawings:

Fig. 1 is a diagrammatic illustration of a system for the hydrogenation of fat.

Fig. 2 is a detailed view of a reactor for hydrogenating fat and showing a plurality of pipes or conduits, the reactor being shown in longitudinal section for the purpose of illustration.

Referring to the drawings, numeral 10 represents a closed scale tank provided with the usual visual indicator means generally designated as 11, as illustrated in Fig. 1. Numeral 12 represents a reactor generally comprising a plurality of housing members or sections. The lower reactor section is identified by the numeral 13 and it provides a sump 14 in the lower end thereof.

Numeral 15 designates a tube or conduit which at one end thereof is connected to the scale tank 10, and which is communicatively connected to an end of a sump pipe or tube 16, which at the other end thereof communicates with sump 14.

Manually operable valve 17, which is illustrated in Fig. 1, controls the flow between scale tank 10 and tube 16, and manually operable valve 18 controls the flow in tube 16 between the sump 14 and conduit 15.

As illustrated in Fig. 1, the conduit 15 extends from sump pipe 16 to a pump 19, the flow therebetween being manually controllable by the valve 20. Conduit or tube 21 communicatively connects pump 19 with conduit or tube 22 which is provided with manually operable valve 23 and another manually operable valve 24. At one end thereof, conduit 22 extends into a storage receptacle 25, which is illustrated at the right of Fig. 1. At the other end thereof conduit 22 extends through the upper section 26 of the reactor 12. A tap 27 connected to the storage tank 25 provides for drainage thereof.

Numeral 28 represents an annular mounting flange which is secured to the upper outer surface of the lower reactor section 13 by any suitable means such as welding or the like. A cooperating annular mounting flange 29 is appropriately secured to the lower outer surface of the upper reactor section 26. A porous filter or filter plate 30 transversely extends between sections 13 and 26 and has an annular end extension 31 extending between flanges 28 and 29. Bolts which extend thru said flanges and cooperating nuts generally represented by numeral 32 releasably secure together the reactor sections in a pressure tight seal and thereby hold the filter plate 30 in the transverse position illustrated in the drawings.

A gas conduit 33 has one end thereof secured in the wall of the lower reactor section 13, the flow of gas through said conduit 33 into the reactor section 13 being controlled by manually operable valve 34. The other end of conduit 33 communicates with a hydrogen gas source (not shown); and a bent pipe or conduit 35, through which gas flow is controlled by manually operable valve 36, is shown here as communicatively connecting gas conduit 33 and the chamber of the upper reactor section 26, the opposite end of the conduit 35 extending through the wall of the upper reactor section 26 at a level above the highest level of the liquid charge (the highest level of the liquid charge is illustrated by the broken line in Fig. 2).

Numeral 37 represents a by-pass conduit or tube which has one end thereof adjacent the bottom of sump 14 and the other end thereof above the highest liquid level in the upper reactor section 26. As illustrated in the drawings, the conduit 37 is secured to and extends through the walls of both the upper section 26 and the lower section 13, and said conduit 37 has an intermediate offset portion outside of the reactor in which there is mounted a manually operable valve 38 for controlling the flow in said last identified conduit.

The end of a vacuum conduit 39 is secured in an upper portion of the wall of the upper reactor section 26 and said conduit 39 communicatively connects the reactor chamber with a vacuum generating device generally identified by the numeral 40. A manually operable valve 41 in conduit 39 controls the flow through said conduit.

The upper reactor section 26 is apertured and has integral therewith or suitably secured thereon a small pipe section or nipple 42 about the orifice of said aperture to thereby provide an armhole for an operator. Said nipple 42 has a small annular flange 43 to which a cover plate 44 is removably secured by bolts or screws or the like 45.

A plurality of longitudinally extending baffle plates 46 are securely connected to the inner wall of upper section 26, as illustrated in Fig. 2.

Further, a heating element 57, herein illustrated as a steam coil, is disposed within the chamber of the upper section 26. Said steam coil has a steam inlet pipe 47 and an outlet pipe 48 mounted in and extending through the wall of said section 26.

Integral with the upper reactor section 26 and extending outwardly therefrom is a neck 49 having an annular flange 50. Numeral 51 represents an apertured cover plate which by a plurality of bolts and nuts 52, or equivalent means, is releasably secured to flange 51. Numeral 53 represents a frame for holding a motor 54 and said frame is mounted on plate 51.

Motor 54 drives an elongated shaft 55 which is journalled in the aperture of cover plate 51. At its distal end, the shaft 55 has mounted thereon and secured thereto a plurality of fins or paddles 56 providing an agitator.

Numeral 58 represents a tap or sample cock which is secured in the wall of the upper section 26 and is preferably positioned at an intermediate level thereof to obtain representative samples as will be hereinafter apparent.

The essential physical structure having thus been described, the operation of the reactor and the process for effecting a product resulting from a catalytic reaction is as follows:

It is to be understood that the entire process occurs in an air or pressure tight system and wherever a physical element is described as extending or extends through the wall of the reactor the mounting is pressure tight. Also plates 44 and 51, when operably mounted, seal the respective orifices which they cover.

At initiation of the process a charge of liquid such as oil is placed within scale tank 10, the amount (which is predetermined) being registered on indicator 11, the empty spaces in the scale tank 10 being flooded with an inert gas such as hydrogen, nitrogen or carbon dioxide.

Thereafter valves 17 and 18 are opened by an operator, valve 20 and by-pass valve 38 being closed. Simultaneously valve 41 is opened creating a vacuum force within reactor 12 and the charge flows into the reactor under the force of gas in the scale tank and the vacuum force in the reactor.

Under such conditions the liquid charge is carried up through filter plate 30 and is mixed with the catalyst, which has previously been deposited in or on said plate upon removal of a prior finished product or by an operator through the hand hole in nipple 42.

As the level of the liquid rises in the chamber of the upper reactor section 26, the motor 54 is set into operation causing agitation of the mass, and steam is applied in coil 57; and as soon as the measured charge has thusly been transferred to the reactor, valves 17 and 18 are closed. Thereupon by-pass valve 38 is opened and hydrogen gas (if the process is fat hydrogenation) or other suitable reacting gas is admitted into the chamber of the lower reactor section 13 through conduit 33, valve 34 being opened and valve 36 being closed. This causes any portion of the charge not previously transferred above the filter plate 30 and remaining in the chamber of lower section 13 and sump 14 to be forced through by-pass conduit 37 into the chamber of upper section 26 or reaction chamber.

Once the entire charge has been transferred to the reaction chamber (the chamber provided in the upper section 26), valve 38 is closed and the gas is permitted to pass through the charge to purge it of any trace of contaminating gas, and then thereafter valve 41 is closed. Hydrogenation to the desired degree is completed with hydrogen which enters the reaction chamber through the filter plate from conduit 33 in the form of tiny bubbles.

During the process agitation of the charge is facilitated by baffle plates 46; and samples are withdrawn through tap 58 to determine whether or not an end point has been reached.

After reaching the desired end point, valve 34 is closed and the charge is permitted to cool by passing a coolant through coils 57. When the temperature of the oil has reached a safe level, the agitator is stopped and the hydrogen gas pressure is released, valve 34 being closed. The environmental conditions of the reacted charge must be maintained at a level to keep it in a filterable phase.

Thereafter, valves 18 and 24 are opened and through the action of pump 19, the hydrogenated charge is delivered to the storage tank 25.

By opening valve 36, hydrogen is permitted to enter the reaction chamber from above the charge as withdrawal thereof occurs. Other inert gases may optionally be used to preclude air contamination.

It will be understood, that as the filterable hydrogenated charge is withdrawn, passing through filter plate 30, the catalyst is retained by the filter, thereon building up a filter bed. The process, of course, precludes the handling of the catalyst except for the initial positioning thereof, and the process permits for use of catalyst repeatedly and without handling in subsequent batches.

In the event an adequate bed has not been built upon the plate 30, to cause retention of all the catalyst on the filter, the hydrogenated charge may be recirculated prior to storage by closing valve 24 and opening valve 23.

The present invention comprises a marked departure from heretofore known methods and conventional techniques for effecting catalytic reactions and as a result substantial cost savings in initial expenditure and in operation are possible over the conventional and prior processes.

Inasmuch as many changes could be made in the above described construction and process, and inasmuch as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. An apparatus for reacting oil and the like with hydrogen, comprising a reactor having a pair of chambers; a filter secured between said chambers; a first conduit connected to the lower of said chambers for introducing a charge of oil into one of said chambers and removing a finished product from said reactor; a by-pass conduit communicatively connected with each of said chambers and adapted to clear the lower chamber of charge material; a gas conduit communicatively connected with the lower of said chambers and a vacuum creating apparatus communicatively connected with one of said chambers above the level of a full charge, said first conduit being a discharge conduit upon release of gas pressure in said reactor.

2. An apparatus substantially as defined in claim 4 and having a heating element in the upper of said chambers, a plurality of baffles secured to the walls of the reactor and extending into the upper of said chambers, and an agitator in the upper of said chambers.

3. In a process for treating oil and the like with hydrogen, adding a catalyst in fine suspension to a measured charge of oil by moving a portion of the charge under gravity and vacuum action through a filter having catalyst deposited therein into a reaction chamber; moving the remainder of the charge into the reaction chamber under the force of gas pressure and vacuum while by-passing the filter; passing hydrogen gas through a plurality of pores and then through the charge; subjecting the charge to reaction conditions, and then filtering the finished product through said filter to redeposit the catalyst while adding a gas to the space vacated by the finished product, all in an air-free environment.

4. A reactor for treating oil and the like with hydrogen, comprising an upper and a lower chamber, a filter extending between said chambers and providing therethrough two paths; a conduit communicatively connected with said lower chamber at the bottom thereof for delivery of a charge to said lower chamber; means including a gas conduit connected to said reactor for varying the pressure therein to thereby effect a transfer through said filter of a charge from said lower to the upper chamber, and back.

5. A chemical reactor for treating oil and the like with hydrogen, comprising an upper chamber and a lower chamber having a sump; an inlet-outlet conduit communicatively connected with said sump; a filter extending between chambers and providing an upward and downward path for a liquid; a by-pass conduit mounted in said reactor and communicatively connecting said lower chamber and being arranged to by-pass said filter with said upper chamber; a gas conduit communicatively connected to said lower chamber; exhaust means communicatively connected to the upper chamber, the release of the gas pressure permitting a finished product to descend through said filter into said lower chamber, the increase in gas pressure forcing a charge up through said filter.

6. An apparatus for treating oil and the like with hydrogen, comprising a reactor having a plurality of communicating chambers; means for delivering a charge of oil into the lower of said chambers; means between said chambers for substantial physical separation thereof and providing a plurality of pores between said chambers, said pores providing a two-way path; means including a gas conduit and a control therefore adapted to cause substantially all of the charge to move in one direction from below said pores partially through said path and a finished product in another direction from above said pores through said path.

7. An apparatus for treating oil and the like with hydrogen comprising a reactor having two communicating chambers, a filter providing a two-way path at an end of one of said chambers; means for delivering a portion of a charge of oil through said filter into one of said chambers; means for delivering hydrogen into said last mentioned chamber and forcing the remainder of said charge into said last-mentioned chamber around said filter, and means for depositing a catalyst on said filter while delivering the finished product to the other of said chambers through said filter.

8. In a process for effecting chemical reactions between oils and the like and hydrogen in the presence of a solid catalyst, the steps of moving oil through a catalyst-containing-filter into a reaction chamber while dislodging the catalyst from the filter; introducing hydrogen under pressure into the reaction chamber through said filter, and then releasing the pressure of the reacting gas to move the finished product back through said filter.

9. In a process for effecting reactions between oil and the like and hydrogen, the steps of moving liquid oil upwardly through the bed of a filter containing a catalyst while dislodging said catalyst from the filter; subjecting the charge to heat and hydrogen action, and then moving the finished product downwardly through the same filter to remove the catalyst and redeposit it in said filter, all in an air-free environment.

10. In a process for effecting catalytic reactions wherein hydrogen is combined with an oil and the like in the presence of a solid catalyst, moving a measured charge of oil into a reaction chamber through an air-free passage from the bottom of the reactor; adding catalyst to said charge as it enters the reaction chamber and subjecting the charge to heat pressure and gas action in an air-free environment; then removing the catalyst from the finished product at the same position said catalyst was added, all in an air-free environment.

11. In a process for effecting catalytic reactions wherein an oil and the like and hydrogen are combined in the presence of a solid catalyst, the steps of moving a measured charge of oil into a reaction chamber through a filter having a catalyst deposited therein and in an air-free environment from the bottom of the reactor; subjecting the charge to heat and pressure while simultaneously introducing hydrogen gas and then moving said charge back through said filter to redeposit therein the catalyst upon release of the gas pressure.

12. In a process for treating oil and the like with hydrogen, moving a portion of a measured charge of oil into a reaction chamber under gravity and vacuum force upwardly through a filter having a catalyst deposited therein to pick up the catalyst; transferring the remainder of the charge into the reaction chamber while by-passing the filter; passing hydrogen gas through said filter and said charge to purge the charge; then increasing the pressure of said gas while heating and agitating said charge, and then releasing the pressure of said gas to thereby permit the flow of the finished product downwardly through said filter to redeposit therein said catalyst.

13. In a process for effectuating a chemical reaction between oil and the like and hydrogen, the combination of providing an air-free environment for said reaction, supplying heat, hydrogen and an oil in the reaction chamber, with the steps of moving the oil into the reaction chamber through a filter having therein deposited a catalyst, and moving the finished product through the same filter to redeposit the catalyst.

References Cited in the file of this patent

UNITED STATES PATENTS

| | | |
|---|---|---|
| 1,040,531 | Ellis | Oct. 8, 1912 |
| 1,071,221 | Ellis | Aug. 26, 1913 |
| 1,121,860 | Moore | Dec. 22, 1914 |
| 1,157,993 | McElroy | Oct. 26, 1915 |
| 1,242,445 | Ittner | Oct. 9, 1917 |